United States Patent
Fisher-Stawinski et al.

(10) Patent No.: US 11,823,235 B1
(45) Date of Patent: Nov. 21, 2023

(54) VIRTUAL PERSONALIZATION BASED ON PERSONAS

(71) Applicant: International Business Machines Corporation, Armonk, NY (US)

(72) Inventors: Steven Lee Fisher-Stawinski, Buffalo Grove, IL (US); Scott E. Schneider, Rolesville, NC (US); Shikhar Kwatra, San Jose, CA (US); Moitreyee Mukherjee-Roy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/936,402

(22) Filed: Sep. 29, 2022

(51) Int. Cl.
*G06Q 30/0251* (2023.01)
*G06N 3/08* (2023.01)
*G06Q 30/0241* (2023.01)
*G06N 3/045* (2023.01)

(52) U.S. Cl.
CPC ......... *G06Q 30/0269* (2013.01); *G06N 3/045* (2023.01); *G06N 3/08* (2013.01); *G06Q 30/0276* (2013.01)

(58) Field of Classification Search
CPC .......... G06Q 30/0269; G06Q 30/0276; G06N 3/045; G06N 3/08
See application file for complete search history.

(56) References Cited

U.S. PATENT DOCUMENTS

| 8,392,249 | B2 | 3/2013 | Koningstein |
| 9,058,611 | B2 | 6/2015 | Saunders |
| 10,529,009 | B2 | 1/2020 | Gadre |
| 10,964,078 | B2 | 3/2021 | Wiesel |
| 2012/0239506 | A1* | 9/2012 | Saunders ............... G06Q 30/02 705/14.66 |

(Continued)

FOREIGN PATENT DOCUMENTS

IN    202117056560 A    5/2022

OTHER PUBLICATIONS

Disclosed Anonymously, "Contextualized Ad Generation via a Reinforced Con-GANs Framework", An IP.com Prior Art Database Technical Disclosure, IP.com No. IPCOM000268988D, IP.com Electronic Publication Date: Mar. 14, 2022, 9 Pages.

(Continued)

*Primary Examiner* — Alexandru Cirnu
(74) *Attorney, Agent, or Firm* — Stephanie L. Carusillo (57) ABSTRACT

In an approach for identifying a user's interest in a media object and one or more personalities and presenting the user with a visual of how the media object looks on a particular personality, a processor receives a request to determine suitability of the media object for the user. A processor presents the media object to a multilabel classifier to be matched to a set of profile data of the user and a set of data of one or more personalities. A processor receives an output instruction from the multilabel classifier to combine the media object with a particular personality of the one or more personalities. A processor generates a combined media object of the media object with the particular personality using a generative adversarial neural network. A processor inserts the combined media object into an advertising template to generate an advertisement. A processor presents the advertisement to the user.

19 Claims, 3 Drawing Sheets

(56) References Cited

U.S. PATENT DOCUMENTS

| | | | | |
|---|---|---|---|---|
| 2015/0324103 A1* | 11/2015 | Tepmongkol | ....... | G06F 3/04842 |
| | | | | 715/757 |
| 2018/0204111 A1* | 7/2018 | Zadeh | .................. | G06V 10/764 |
| 2018/0349256 A1* | 12/2018 | Fong | ..................... | G06F 40/284 |
| 2020/0051303 A1* | 2/2020 | Li | ........................... | G06N 3/045 |
| 2021/0125405 A1* | 4/2021 | Tran | .................... | A61B 5/0205 |

OTHER PUBLICATIONS

Disclosed Anonymously, "Method and System for Online Retail Shopping Using Cognitive Approach", An IP.com Prior Art Database Technical Disclosure, IP.com No. IPCOM000255757D, IP.com Electronic Publication Date: Oct. 12, 2018, 4 Pages.

* cited by examiner

VIRTUAL PERSONALIZATION BASED ON PERSONAS

BACKGROUND OF THE INVENTION

The present invention relates generally to the field of data processing, and more particularly to virtual personalization based on personas.

Virtual personalization is the process of customizing digital content to make it more relevant, compelling, and personal to a target audience. Content may be personalized based on the demographics, location, history of interaction, and preferences of the target audience. By personalizing content to the target audience, digital personalization can engage the target audience by appealing directly to their individual needs, desires, interests, and preferences. Virtual personalization can increase click through rates, conversions, and sales; enable more relevant product recommendations; and improve customer trust, loyalty, and brand affinity.

SUMMARY

Aspects of an embodiment of the present invention disclose a method, computer program product, and computer system for identifying a user's interest in a media object and one or more personalities and presenting the user with a visual of how the media object looks on a particular personality. A processor receives a request to determine suitability of a media object for a user. A processor presents the media object to a multilabel classifier to be matched to a set of profile data of the user and a set of data of one or more personalities followed by the user. A processor receives an output instruction from the multilabel classifier to combine the media object with a particular personality of the one or more personalities. A processor generates a combined media object of the media object with the particular personality using a generative adversarial neural network. A processor inserts the combined media object into an advertising template to generate an advertisement. A processor presents the advertisement, including the combined media object, to the user.

In some aspects of an embodiment of the present invention, the media object is an electronic representation of a physical object. The combined media object is an electronic representation of the physical object with the set of profile data of the user applied to the physical object.

In some aspects of an embodiment of the present invention, the physical object is an item of clothing. The electronic representation of the physical object with the set of profile data of the user applied to the physical object includes an electronic representation of the item of clothing being worn by the particular personality.

In some aspects of an embodiment of the present invention, prior to receiving the request to determine suitability of the media object for the user, a processor gathers the set of profile data from the user. A processor creates a user profile specific to the user. A processor stores the user profile in a database.

In some aspects of an embodiment of the present invention, the set of profile data of the user includes at least one of a body type of the user, a clothing preference of the user, and the one or more personalities followed by the user.

In some aspects of an embodiment of the present invention, subsequent to storing the user profile in the database, a processor initiates training of the multilabel classifier on a combination of input features, wherein the combination of input features includes at least one of the set of profile data of the user and the set of data of one or more personalities followed by the user.

In some aspects of an embodiment of the present invention, subsequent to presenting the advertisement to the user, a processor enables the user to perform at least one action specified in the advertisement. Responsive to the user performing an action of the at least one action specified in the advertisement, a processor generates a positive reward. A processor performs reinforcement learning on the multilabel classifier using the positive reward.

In some aspects of an embodiment of the present invention, subsequent to presenting the advertisement to the user, a processor enables the user to perform the at least one action specified in the advertisement. Responsive to the user declining to perform the at least one action specified in the advertisement, a processor generates a negative reward. A processor performs reinforcement learning on the multilabel classifier using the negative reward.

These and other features and advantages of the present invention will be described in, or will become apparent to those of ordinary skill in the art in view of, the following detailed description of the example embodiments of the present invention.

DETAILED DESCRIPTION

Embodiments of the present invention recognize that e-commerce is the buying and selling of goods and services, or the transmitting of funds or data, on the Internet. E-commerce encompasses a wide variety of data, systems and tools for online buyers and sellers, including mobile shopping and online payment encryption. Embodiments of the present invention recognize that e-commerce is changing the way modern consumers shop. For example, e-commerce makes it possible for the consumer to shop from anywhere at any time. That means consumers can get the products they want and need faster without being constrained by the operating hours of a traditional brick-and-mortar store. Embodiments of the present invention recognize that e-commerce has it disadvantages. One disadvantage is the limited amount of interaction a consumer has with a sales associate. In a traditional brick-and-mortar store, a sales associate is readily available to answer the consumer's questions. The ability to speak with a sales associate about the consumer's wants and needs is often more helpful than trying to find and compare products independently. Another disadvantage is the limited amount of experience a consumer has with a product. For consumers who want to test or try on a product, especially a physical object such as clothing, shoes, or beauty products before adding it to their shopping cart, the e-commerce experience is limited. Taken together, the consumer may have to shop alone for a product and, if the consumer ends up buying a product that differs from their expectations, may have to return the product. Therefore, embodiments of the present invention recognize the need for a system and method to provide insights on suitability of a product for a consumer's personal use.

Embodiments of the present invention provide a system and method for identifying a user's interest in a physical object and one or more personalities and presenting the user with a visual of how the physical object looks on a particular personality. Embodiments of the present invention present the user with the visual in a manner similar to a fashion show. A fashion show is an event typically put on by a fashion designer to showcase an upcoming line of clothing and/or accessories. If the physical object is a non-clothing item offered for sale on an e-commerce platform, such as a piece of furniture, embodiments of the present invention may display the physical object in a panoramic or 360 degree view of a specific room (e.g., a living room) the user is shopping for in order to inspire the user to purchase the physical object. Embodiments of the present invention may change the particular personality over time based on the interests of the user. Details about the user such as the user's height, weight, and structure may be considered when selecting the appropriate personality. Embodiments of the present invention also present the user with a visual of what the particular personality would look like if the particular personality wore something similar to the physical object using Artificial Intelligence (AI) in order to inspire the user to purchase the same. Embodiments of the present invention make adequate suggestions based on activities and interests of the user's family members and/or friends if the user is shopping for the family member and/or friend.

Implementation of embodiments of the present invention may take a variety of forms, and exemplary implementation details are discussed subsequently with reference to the Figures.

Figure 1:
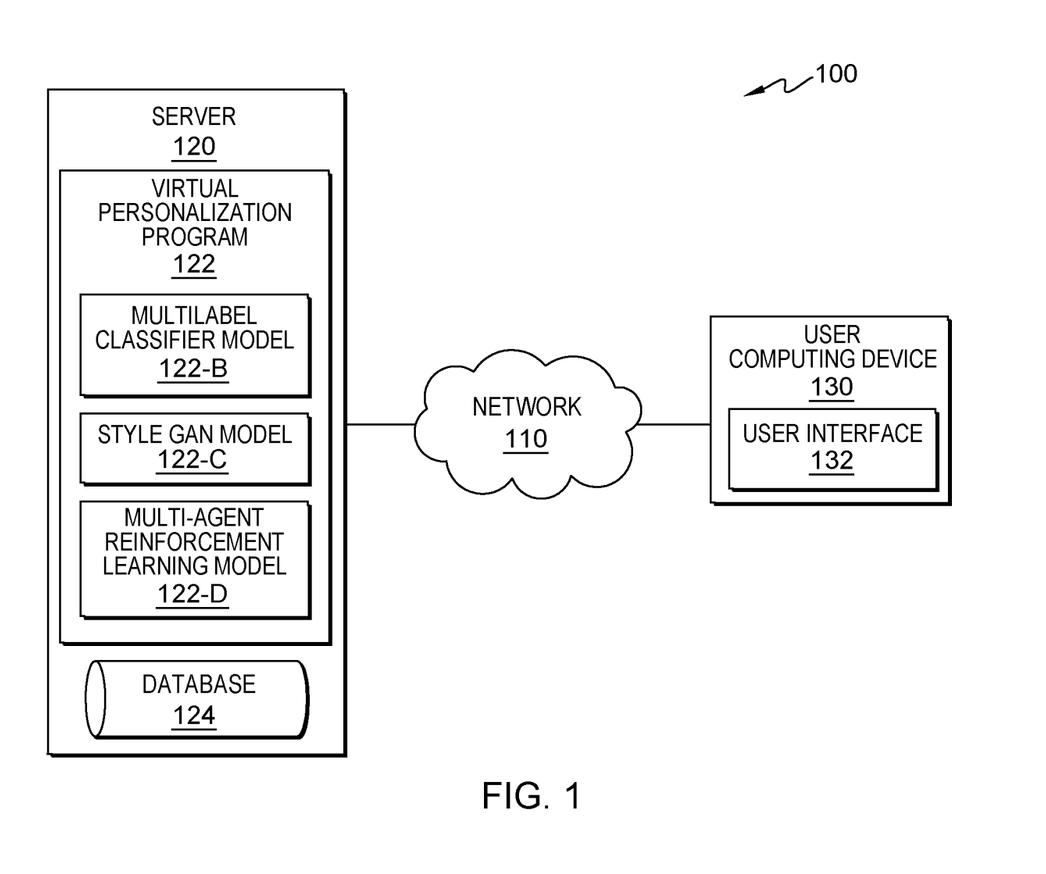
FIG. 1 is a block diagram illustrating a distributed data processing environment, in accordance with an embodiment of the present invention.

FIG. 1 is a block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, and other computing devices (not shown) within distributed data processing environment 100.

Server 120 operates to run virtual personalization program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 3.

Virtual personalization program 122 operates to identify a user's interest in a physical object and one or more personalities and presenting the user with a visual of how the physical object looks on a particular personality. In an embodiment, virtual personalization program 122 relies on an ensemble Artificial Intelligence (AI) framework. The ensemble AI framework is composed of Multilabel Classified Model 122-B, Style GAN Model 122-C, and Multi-Agent Reinforcement Learning Model 122-D. Multilabel Classifier Model 122-B operates to match a media object to a set of profile data of a user and a set of generic data of one or more personalities the user follows to instruct which personality to combine with the media object. Style GAN Model 122-C operates to generate a combined media object. Multi-Agent Reinforcement Learning Model 122-D operates to track whether the user proceeds with a purchase, to generate a positive or negative reward depending on whether the user proceeded with the purchase, and to perform reinforcement learning on Multilabel Classifier Model 122-B.

Virtual personalization program 122 custom trains the ensemble AI framework using one or more computed image signatures of a labeled set of training images. The one or more computed image signatures are obtained by extracting features from one or more patches of a training image. The one or more labels on the labeled set of training images are selected from a finite set of image categories.

Virtual personalization program 122 categorizes one or more image sets of the user using a trained classifier. Virtual personalization program 122 categorizes the one or more image sets of the user into a finite set of image categories based on one or more computed image signatures of the labeled set of training images. The one or more computed image signatures are based on a plurality of pixels of a respective image from the one or more image sets of the user by extracting one or more features from patches of the respective image.

In addition to the initial training, virtual personalization program 122 further trains the ensemble AI framework during and immediately after each iteration of virtual personalization program 122. Subsequent to creating and storing a user profile specific to the user, virtual personalization program 122 initiates training of Multilabel Classifier Model 122B based on a combination of one or more input features (i.e., training data). The one or more input features (i.e., training data) may include, but are not limited to, (1) a set of user profile data (i.e., data about the user, e.g., a body type of the user, a clothing preference of the user (e.g., a tuxedo versus a three-piece suit, a dress shirt versus a t-shirt, a pair of dress pants versus a pair of jeans, and a saree versus a lehenga choli), and the one or more personalities the user follows, e.g., a famous individual the user follows on social media); (2) one or more image sets of the user; (3) a set of generic data (i.e., data about the one or more personalities the user follows); and (4) one or more image sets of the one or more personalities). Virtual personalization program 122 combines the one or more input features with the one or more preferences of the user. Virtual personalization program 122 initiates training of Multilabel Classifier Model 122B to gather personality insights into the user and to profile the user. Virtual personalization program 122 stores the one or more input features in a database (e.g., database 124) as categorical feature variables. Virtual personalization program 122 vectorizes the categorical inputs into numerical feature vectors using a one-hot encoded technique. Virtual personalization program 122 also vectorizes the one or more personalities into numerical context vectors. For example, the user prefers a blue tuxedo as opposed to a blue three-piece suit. The user also admires a famous actor. Visually seeing a blue tuxedo on the actor may influence the user's decision to purchase a blue tuxedo the user is shopping for on an e-commerce platform. In this context, the blue tuxedo is categorized as 0100, a numerical input vector, and the actor is categorized as a numerical feature vector.

In the depicted embodiment, virtual personalization program 122 is a standalone program. In another embodiment, virtual personalization program 122 may be integrated into another software product, such as a type of software used by a business-to-business e-commerce platform, a business-to-consumer e-commerce platform, a consumer-to-consumer e-commerce platform, and a consumer-to-business e-commerce platform. In the depicted embodiment, virtual personalization program 122 resides on server 120. In another embodiment, virtual personalization program 122 may reside on user computing device 130 or on another computing device (not shown), provided that virtual personalization program 122 has access to network 110. The operational steps of virtual personalization program 122 are depicted and described in further detail with respect to FIG. 2.

In an embodiment, the user of user computing device 130 registers with virtual personalization program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via virtual personalization program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Database 124 operates as a repository for data received, used, and/or generated by virtual personalization program 122. A database is an organized collection of data. Data includes, but is not limited to, information about user preferences (e.g., general user system settings such as alert notifications for user computing device 130); information about alert notification preferences; profile (i.e., one or more input features, including (1) a set of user profile data (i.e., data about the user, e.g., a body type of the user, a clothing preference of the user (e.g., a tuxedo versus a three-piece suit, a dress shirt versus a t-shirt, a pair of dress pants versus a pair of jeans, and a saree versus a lehenga choli), and the one or more personalities the user follows); (2) one or more image sets of the user; (3) a set of generic data (i.e., data about the one or more personalities the user follows); and (4) one or more image sets of the one or more personalities); and any other data received, used, and/or generated by virtual personalization program 122.

Database 124 can be implemented with any type of device capable of storing data and configuration files that can be accessed and utilized by server 120, such as a hard disk drive, a database server, or a flash memory. In an embodiment, database 124 is accessed by virtual personalization program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that virtual personalization program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Virtual personalization program 122 enables the authorized and secure processing of personal data.

Virtual personalization program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Virtual personalization program 122 provides information regarding personal and/or confidential data and the nature (e.g., type, scope, purpose, duration, etc.) of the processing. Virtual personalization program 122 provides the user with copies of stored personal and/or confidential company data. Virtual personalization program 122 allows the correction or completion of incorrect or incomplete personal and/or confidential data. Virtual personalization program 122 allows for the immediate deletion of personal and/or confidential data.

User computing device 130 operates to run user interface 132 through which a user can interact with virtual personalization program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running the respective user interface 132 and of communicating (i.e., sending and receiving data) with virtual personalization program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132.

User interface 132 operates as a local user interface between virtual personalization program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from virtual personalization program 122 to a user via network 110. User interface 132 can also display or present alerts including information (such as graphics, text, and/or sound) sent from virtual personalization program 122 to a user via network 110. In an embodiment, user interface 132 is capable of sending and receiving data (i.e., to and from virtual personalization program 122 via network 110, respectively). Through user interface 132, a user can opt-in to virtual personalization program 122; set user preferences and alert notification preferences; input information necessary to create a user profile (i.e., one or more input features, including (1) a set of user profile data (i.e., data about the user, e.g., a body type of the user, a clothing preference of the user (e.g., a tuxedo versus a three-piece suit, a dress shirt versus a t-shirt, a pair of dress pants versus a pair of jeans, and a saree versus a lehenga choli), and the one or more personalities the user follows); (2) one or more image sets of the user; (3) a set of generic data (i.e., data about the one or more personalities the user follows); and (4) one or more image sets of the one or more personalities); load an interactive application on which a media object is offered for sale; view an advertisement; perform at least one action specified in the advertisement; receive a request for feedback; and input feedback.

A user preference is a setting that can be customized for a particular user. A set of default user preferences are assigned to each user of virtual personalization program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data. Machine-learned data includes, but is not limited to, past results of iterations of virtual personalization program 122.

Figure 2:
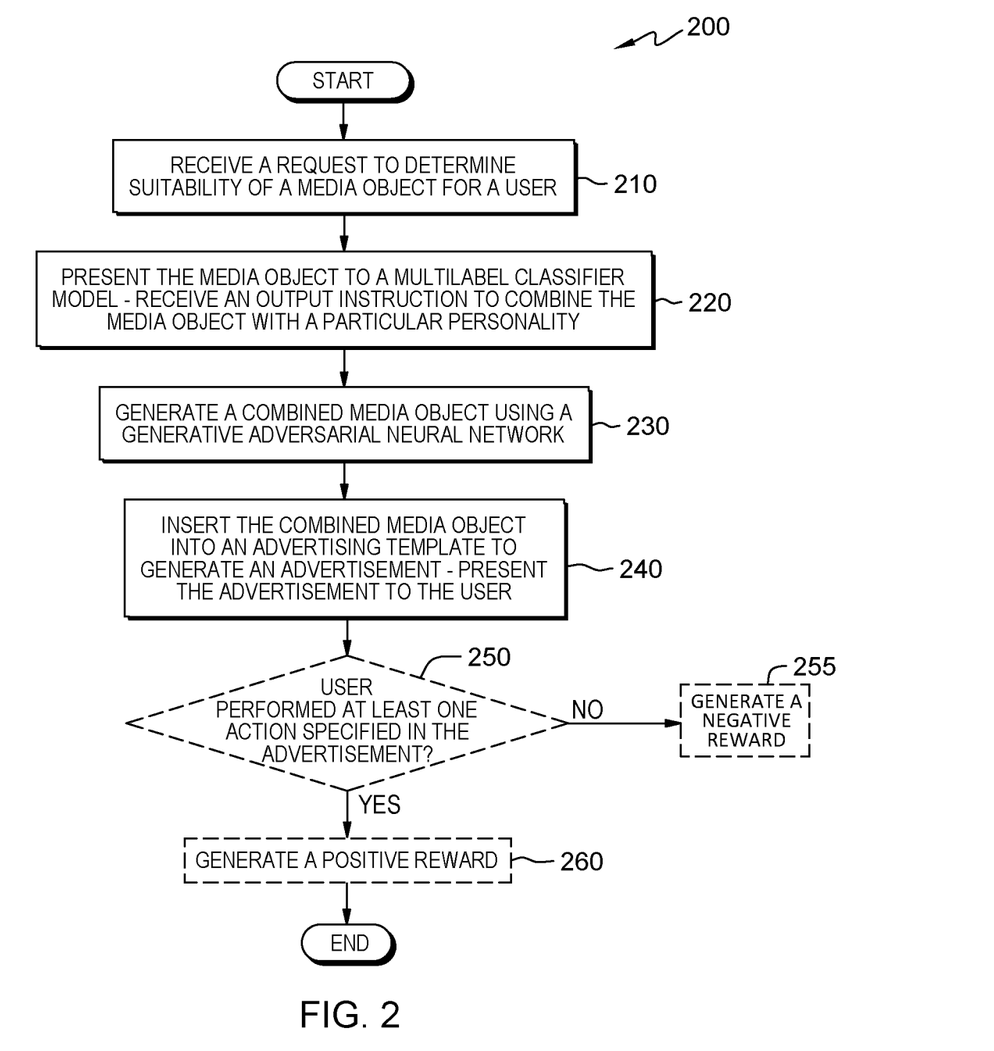
FIG. 2 is a flowchart illustrating the operational steps of a virtual personalization program, on a server within the distributed data processing environment of FIG. 1, in accordance with an embodiment of the present invention.

FIG. 2 is a flowchart, generally designated 200, illustrating the operational steps for virtual personalization program 122 in distributed data processing environment 100 of FIG. 1, in accordance with an embodiment of the present invention. In an embodiment, virtual personalization program 122 operates to identify a user's interest in a physical object and one or more personalities and presenting the user with a visual of how the physical object looks on a particular personality. It should be appreciated that the process depicted in FIG. 2 illustrates one possible iteration of virtual personalization program 122, which may be repeated for each request received referencing a media object.

In step 210, virtual personalization program 122 receives a request to determine suitability of a media object for a user. The media object is an electronic representation of a physical object. The physical object may include, but is not limited to, a clothing item, a non-clothing item, and a digital good. For example, the media object is an item of clothing offered for sale on an e-commerce platform. In another example, the media object is a non-clothing item offered for sale on an e-commerce platform, such as a piece of furniture. In yet another example, the media object is a digital good offered for sale, such as a non-fungible token (NFT); a font, logo, pattern, theme, template, photo, or graphic; and an e-learning online course.

In step 220, virtual personalization program 122 presents the media object to Multilabel Classifier Model 122-B. In an embodiment, virtual personalization program 122 presents the media object to Multilabel Classifier Model 122-B to be matched with a set of profile data of the user and a set of generic data of one or more personalities the user follows. In an embodiment, virtual personalization program 122 receives an output instruction from Multilabel Classifier Model 122-B to combine the media object with a particular personality of the one or more personalities based, at least in part, on matching the media object to the set of profile data of the user and the set of generic data of the one or more personalities the user follows.

In step 230, virtual personalization program 122 generates a combined media object. The combined media object is an electronic representation of the physical object with the set of profile data of the user applied to it (e.g., image, visual, GIF). For example, the electronic representation of the physical object applied to the set of profile data of the user includes an electronic representation of an item of clothing being worn by the particular personality. In an embodiment, virtual personalization program 122 generates a combined media object using a generative adversarial neural network. The generative adversarial neural network employed by virtual personalization program 122 is a Style Generative Adversarial Neural Network (i.e., Style GANs Model 122-C). Style GANs Model 122-C consists of a Generator Network G and a Discriminator Network D. The Generator Network G is trained to generate a visual variation of a personality that has been captured as an output from Multilabel Classifier Model 122-B in the form of textual information. The Discriminator Network D is trained to identify if the generated visual is real in light of the personality chosen as the recommended entity to be displayed and the media object originality on the personality. In an embodiment, virtual personalization program 122 enables the model-generator output to go through the comparator of the Generator Network G and the Discriminator Network D model.

In step 240, virtual personalization program 122 inserts the combined media object into an advertising template to generate an advertisement. The advertisement includes a link to information about the media object (e.g., the piece of clothing). In an embodiment, virtual personalization program 122 presents the advertisement, including the combined media object, to the user. In an embodiment, virtual personalization program 122 presents the advertisement to the user through the user interface (e.g., user interface 132) of the user computing device (e.g., user computing device 130).

In decision step 250, virtual personalization program 122 determines whether the user performs at least one action specified in the advertisement. If virtual personalization program 122 determines the user performs at least one action specified in the advertisement (decision step 250, YES branch), then virtual personalization program 122 proceeds to step 260, generating a positive reward. If virtual personalization program 122 determines the user does not perform at least one action specified in the advertisement (decision step 250, NO branch), then virtual personalization program 122 proceeds to step 255, waiting a specified period of time for the user to perform at least one action specified in the advertisement and then proceeding to generating a negative reward.

In step 260, responsive to the user performing at least one action specified in the advertisement, virtual personalization program 122 generates a positive reward using Multi-Agent Reinforcement Learning Model 122-D. In an embodiment, virtual personalization program 122 performs reinforcement learning on Multilabel Classifier Model 122-B using Multi-Agent Reinforcement Learning Model 122-D and the positive reward generated by Multi-Agent Reinforcement Learning Model 122-D. Multi-Agent Reinforcement Learning Model 122-D performs reinforcement learning on Multilabel Classifier Model 122-B in Environment E generated from Style GANs Model 122-C. One or more inputs of the user are recorded as actions ingested by Software Agent A as part of the reinforcement learning framework for the user. Multi-Agent Reinforcement Learning Model 122-D tracks whether the user proceeds with a purchase. The state S(t) transitions into another positive state S(t+1) if Software Agent A acts upon Environment E with a positive purchase, thus indicating a positive reward function R. Positive reward function R is proportional to the purchase. This information is then fed back to Multilabel Classifier Model 122-B. Therefore, as part of the reinforcement learning framework, a positive reward (i.e., R=f(+x)) is equivalent to a purchase which is generated when the user buys the item based on the generated visual. However, if the user does not buy the item, or clicks off the advertisement, then a negative reward (i.e., R=f(−x)) is applied, which modifies the first classifier attributes which is fed back to Multilabel Classifier Model 122-B.

Referring back to step 255, responsive to the user declining to perform at least one action specified in the advertisement, virtual personalization program 122 waits a specified period of time to allow the user to perform at least one action specified in the advertisement. If the specified period of time ends and the user has not performed at least one action specified in the advertisement, virtual personalization program 122 generates a negative reward using Multi-Agent Reinforcement Learning Model 122-D. In an embodiment, virtual personalization program 122 performs reinforcement learning on Multilabel Classifier Model 122-B using Multi-Agent Reinforcement Learning Model 122-D and the negative reward generated by Multi-Agent Reinforcement Learning Model 122-D.

In some embodiments, virtual personalization program 122 may perform steps 250, 255, and 260 as optional steps.

Figure 3:
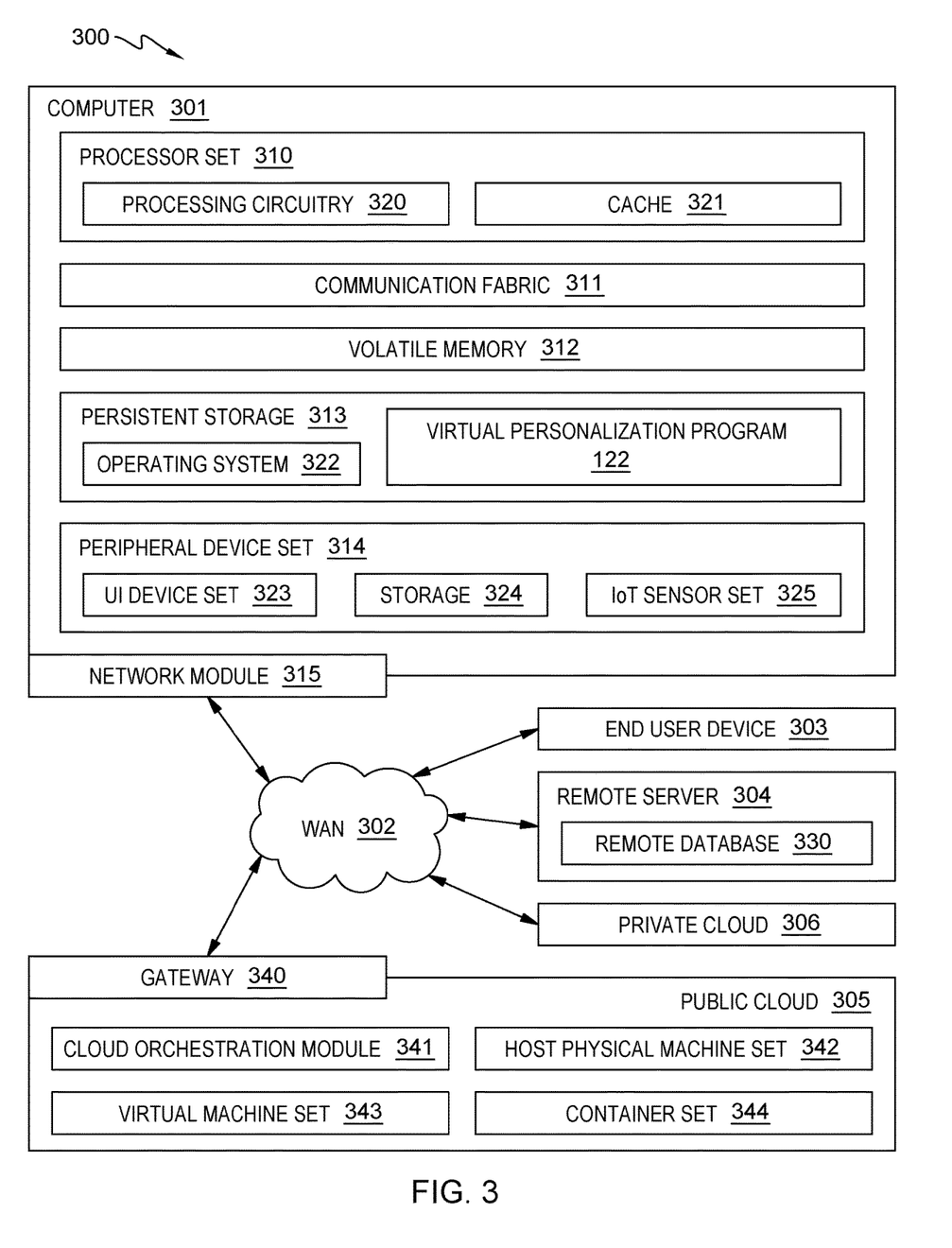
FIG. 3 is a block diagram illustrating the components of the server within the distributed data processing environment of FIG. 1, in accordance with an embodiment of the present invention.

FIG. 3 depicts a block diagram of components of server 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as virtual personalization program 122 for mixed reality scenario generation for cross industry training. In addition to virtual personalization program 122, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and virtual personalization program 122, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in virtual personalization program 122 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in virtual personalization program 122 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, a request to determine suitability of a media object for a user, wherein the media object is an electronic representation of a physical object;
presenting, by the one or more processors, the media object to a multilabel classifier to be matched to a set of profile data of the user and a set of data of one or more personalities followed by the user;
receiving, by the one or more processors, an output instruction from the multilabel classifier to combine the media object with a particular personality of the one or more personalities;
generating, by the one or more processors, a combined media object using a generative adversarial neural network, wherein the combined media object is an electronic representation of the physical object with the particular personality applied to the physical object, wherein the generative adversarial neural network is a Style Generative Adversarial Neural Network, and wherein the Style Generative Adversarial Neural Network consists of a Generator Network G and a Discriminator Network D, and wherein the Generator Network G is trained to generate a visual variation of a personality captured as an output from the multilabel classifier model in a textual format, and wherein the Discriminator Network D is trained to identify if the visual variation of the personality generated is real in light of a personality chosen as a recommended entity to be displayed and an originality of the media object on the personality chosen;
inserting, by the one or more processors, the combined media object into an advertising template to generate an advertisement; and
presenting, by the one or more processors, the advertisement, including the combined media object, to the user.

2. The computer-implemented method of claim 1, wherein:
the physical object is an item of clothing; and
the electronic representation of the physical object with the set of profile data of the user applied to the physical object includes an electronic representation of the item of clothing being worn by the particular personality.

3. The computer-implemented method of claim 1, further comprising:
prior to receiving the request to determine suitability of the media object for the user, gathering, by the one or more processors, the set of profile data from the user, wherein the set of profile data of the user includes at least one of a body type of the user, a clothing preference of the user, and the one or more personalities followed by the user;
creating, by the one or more processors, a user profile specific to the user; and
storing, by the one or more processors, the user profile in a database.

4. The computer-implemented method of claim 3, further comprising:
subsequent to storing the user profile in the database, initiating, by the one or more processors, training of the multilabel classifier on a combination of input features, wherein the combination of input features includes at least one of the set of profile data of the user and the set of data of one or more personalities followed by the user.

5. The computer-implemented method of claim 1, further comprising:
subsequent to presenting the advertisement to the user, enabling, by the one or more processors, the user to perform the at least one action specified in the advertisement;
responsive to the user declining to perform the at least one action specified in the advertisement, generating, by one or more processors, a negative reward; and
performing, by one or more processors, reinforcement learning on the multilabel classifier using the negative reward.

6. The computer-implemented method of claim 1, wherein generating the combined media object using the generative adversarial neural network further comprises:
enabling, by the one or more processors, the model-generator output to go through a comparator of the Generator Network G and the Discriminator Network D model.

7. The computer-implemented method of claim 1, further comprising:
subsequent to presenting the advertisement, including the combined media object, to the user, enabling, by the one or more processors, the user to perform at least one action specified in the advertisement;
responsive to the user performing an action of the at least one action specified in the advertisement, generating, by one or more processors, a positive reward using a multi-agent reinforcement learning model; and
performing, by one or more processors, reinforcement learning on the multilabel classifier using the positive reward.

8. A computer program product comprising:
one or more computer readable storage media and program instructions stored on the one or more computer readable storage media, the program instructions comprising:
program instructions to receive a request to determine suitability of a media object for a user, wherein the media object is an electronic representation of a physical object;
program instructions to present the media object to a multilabel classifier to be matched to a set of profile data of the user and a set of data of one or more personalities followed by the user;
program instructions to receive an output instruction from the multilabel classifier to combine the media object with a particular personality of the one or more personalities;
program instructions to generate a combined media object using a generative adversarial neural network, wherein the combined media object is an electronic representation of the physical object with the particular personality applied to the physical object, wherein the generative adversarial neural network is a Style Generative Adversarial Neural Network, and wherein the Style Generative Adversarial Neural Network consists of a Generator Network G and a Discriminator Network D, and wherein the Generator Network G is trained to generate a visual variation of a personality captured as an output from the multilabel classifier model in a textual format, and wherein the Discriminator Network D is trained to identify if the visual variation of the personality generated is real in light of a personality chosen as a recommended entity to be displayed and an originality of the media object on the personality chosen;

program instructions to insert the combined media object into an advertising template to generate an advertisement; and program instructions to present the advertisement, including the combined media object, to the user.

9. The computer program product of claim 8, further comprising:
prior to receiving the request to determine suitability of the media object for the user, program instructions to gather the set of profile data from the user, wherein the set of profile data of the user includes at least one of a body type of the user, a clothing preference of the user, and the one or more personalities followed by the user;
program instructions to create a user profile specific to the user; and
program instructions to store the user profile in a database.

10. The computer program product of claim 9, subsequent to storing the user profile in the database, program instructions to initiate training of the multilabel classifier on a combination of input features, wherein the combination of input features includes at least one of the set of profile data of the user and the set of data of one or more personalities followed by the user.

11. The computer program product of claim 8, further comprising:
subsequent to presenting the advertisement to the user, program instructions to enable the user to perform the at least one action specified in the advertisement;
responsive to the user declining to perform the at least one action specified in the advertisement, program instructions to generate a negative reward; and
program instructions to perform reinforcement learning on the multilabel classifier using the negative reward.

12. The computer program product of claim 8, wherein generating the combined media object using the generative adversarial neural network further comprises:
enabling, by the one or more processors, the model-generator output to go through a comparator of the Generator Network G and the Discriminator Network D model.

13. The computer program product of claim 8, further comprising:
subsequent to program instructions to present the advertisement, including the combined media object, to the user, program instructions to enable the user to perform at least one action specified in the advertisement;
responsive to the user performing an action of the at least one action specified in the advertisement, program instructions to generate a positive reward using a multi-agent reinforcement learning model; and
program instructions to perform reinforcement learning on the multilabel classifier using the positive reward.

14. A computer system comprising:
one or more computer processors;
one or more computer readable storage media;
program instructions collectively stored on the one or more computer readable storage media for execution by at least one of the one or more computer processors, the stored program instructions comprising:
program instructions to receive a request to determine suitability of a media object for a user, wherein the media object is an electronic representation of a physical object;
program instructions to present the media object to a multilabel classifier to be matched to a set of profile data of the user and a set of data of one or more personalities followed by the user;

program instructions to receive an output instruction from the multilabel classifier to combine the media object with a particular personality of the one or more personalities;
program instructions to generate a combined media object using a generative adversarial neural network, wherein the combined media object is an electronic representation of the physical object with the particular personality applied to the physical object, wherein the generative adversarial neural network is a Style Generative Adversarial Neural Network, and wherein the Style Generative Adversarial Neural Network consists of a Generator Network G and a Discriminator Network D, and wherein the Generator Network G is trained to generate a visual variation of a personality captured as an output from the multilabel classifier model in a textual format, and wherein the Discriminator Network D is trained to identify if the visual variation of the personality generated is real in light of a personality chosen as a recommended entity to be displayed and an originality of the media object on the personality chosen;
program instructions to insert the combined media object into an advertising template to generate an advertisement; and
program instructions to present the advertisement, including the combined media object, to the user.

15. The computer system of claim 14, further comprising:
prior to receiving the request to determine suitability of the media object for the user, program instructions to gather the set of profile data from the user, wherein the set of profile data of the user includes at least one of a body type of the user, a clothing preference of the user, and the one or more personalities followed by the user;
program instructions to create a user profile specific to the user; and
program instructions to store the user profile in a database.

16. The computer system of claim 15, subsequent to storing the user profile in the database, program instructions to initiate training of the multilabel classifier on a combination of input features, wherein the combination of input features includes at least one of the set of profile data of the user and the set of data of one or more personalities followed by the user.

17. The computer system of claim 14, further comprising:
subsequent to presenting the advertisement to the user, program instructions to enable the user to perform the at least one action specified in the advertisement;
responsive to the user declining to perform the at least one action specified in the advertisement, program instructions to generate a negative reward; and
program instructions to perform reinforcement learning on the multilabel classifier using the negative reward.

18. The computer system of claim 14, wherein generating the combined media object using the generative adversarial neural network further comprises:
enabling, by the one or more processors, the model-generator output to go through a comparator of the Generator Network G and the Discriminator Network D model.

19. The computer system of claim 14, further comprising:
subsequent to program instructions to present the advertisement, including the combined media object, to the user, program instructions to enable the user to perform at least one action specified in the advertisement;
responsive to the user performing an action of the at least one action specified in the advertisement, program instructions to generate a positive reward using a multi-agent reinforcement learning model; and program instructions to perform reinforcement learning on the multilabel classifier using the positive reward.

\* \* \* \* \*